INVENTOR
CLARENCE W. VOGT

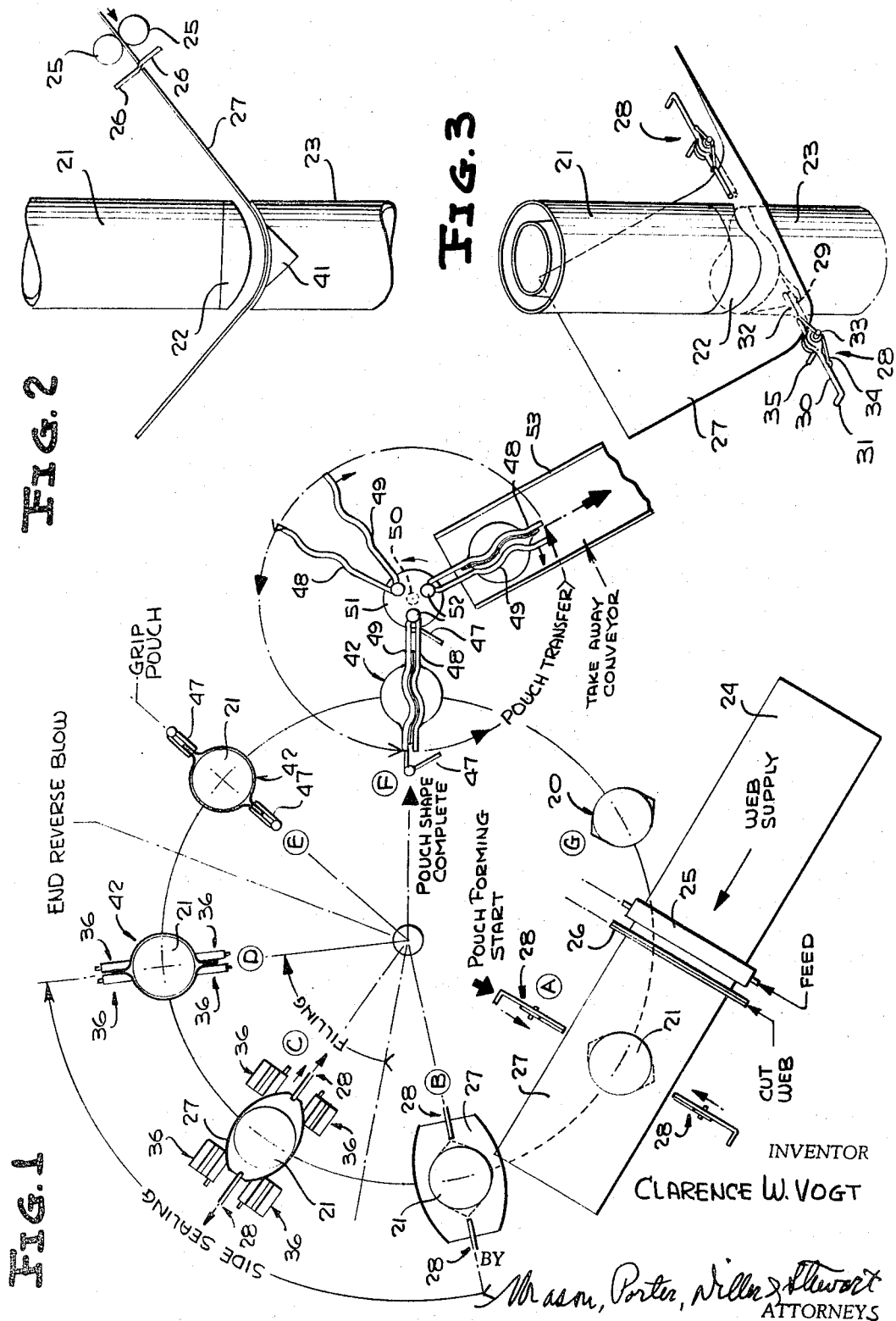

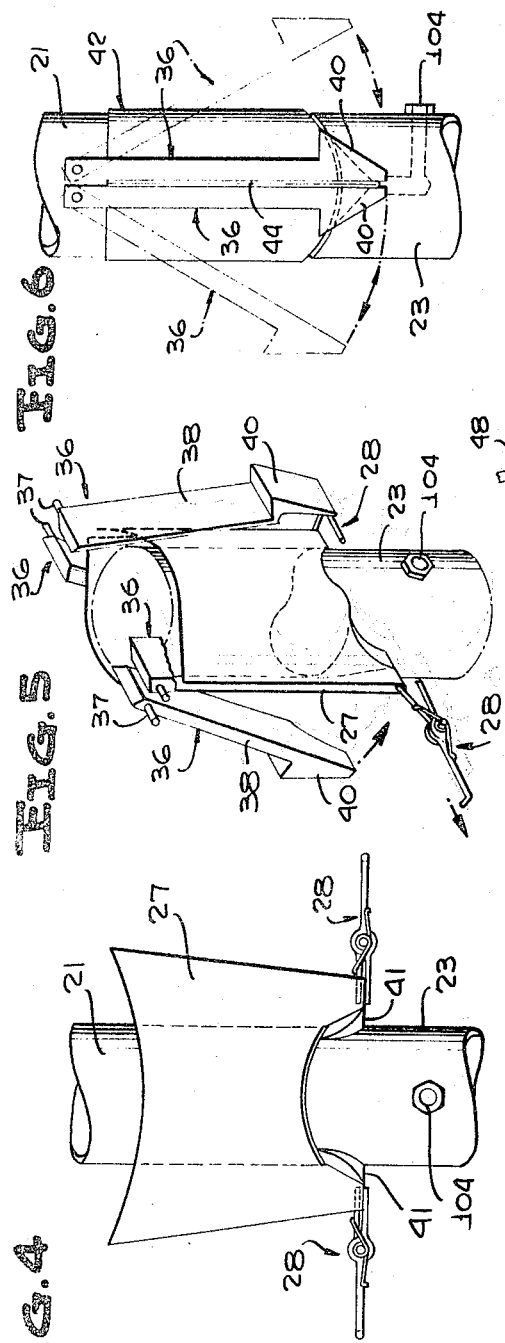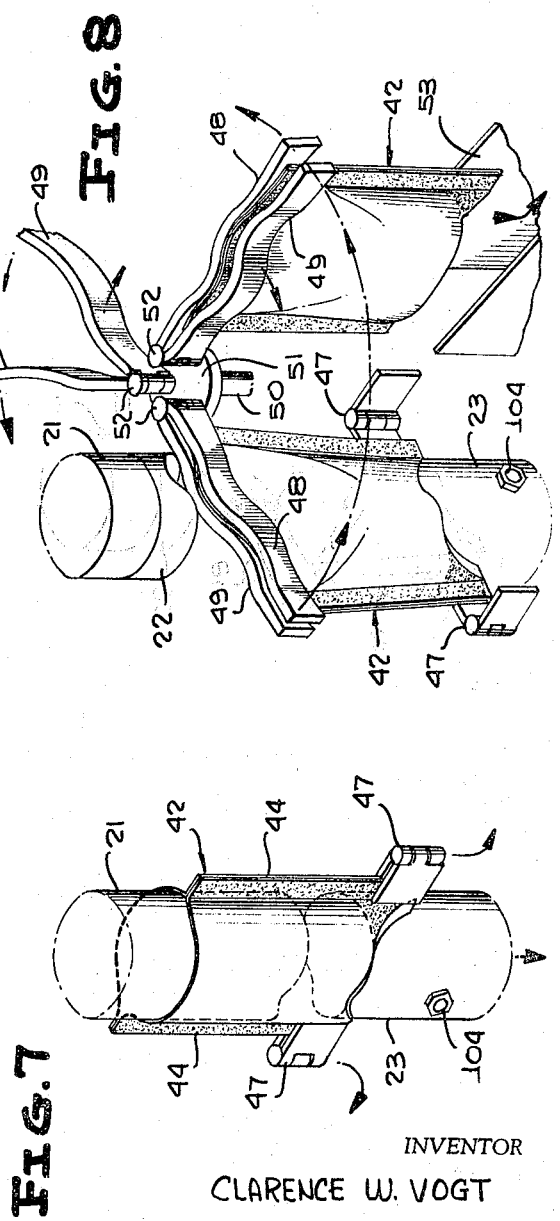

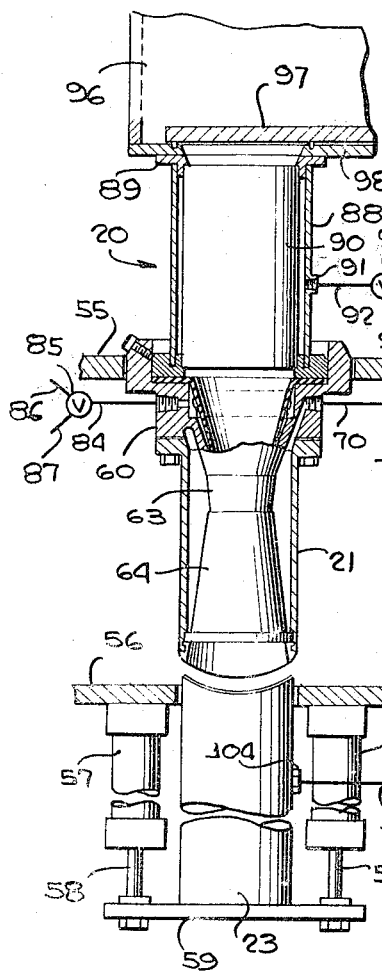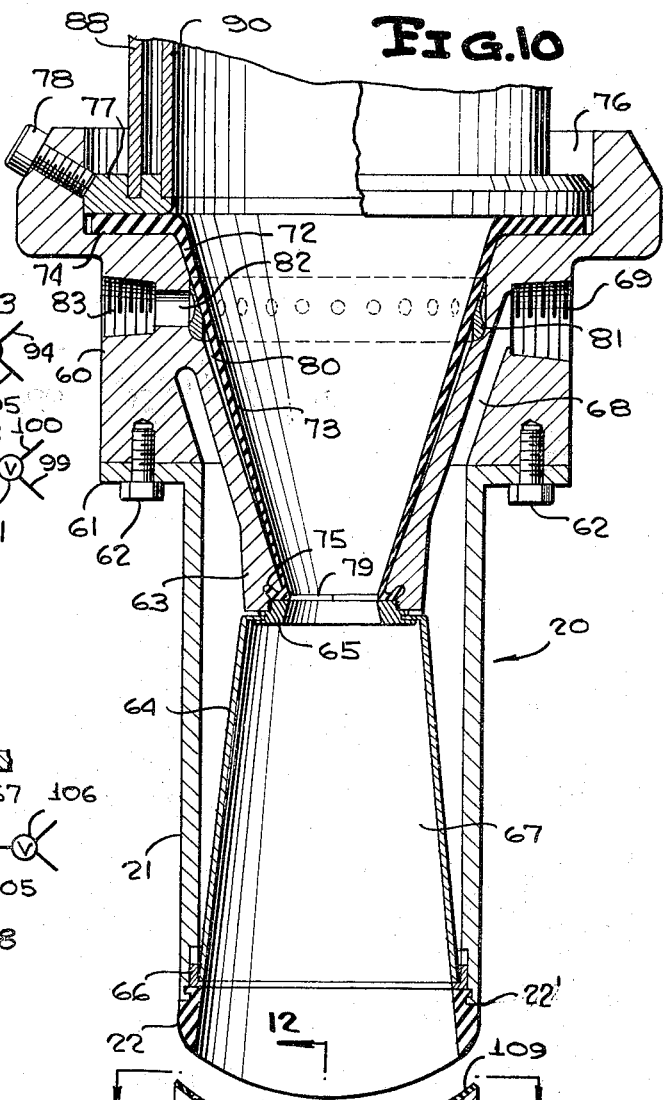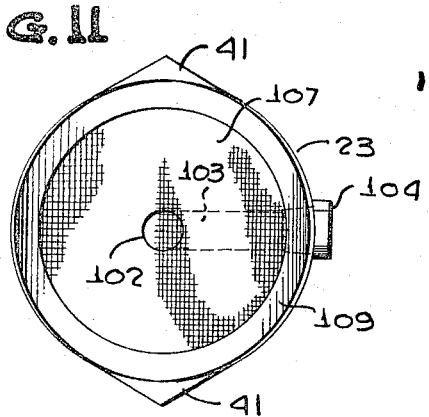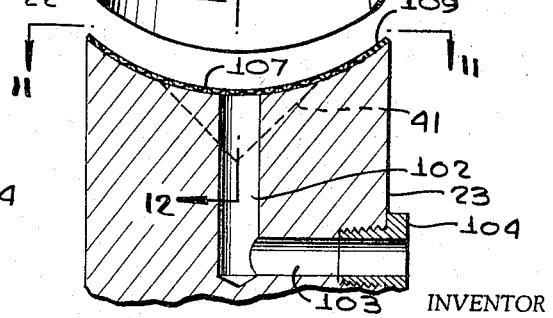

United States Patent Office 3,306,002
Patented Feb. 28, 1967

3,306,002
BAG FORMING AND FILLING APPARATUS
AND METHOD
Clarence W. Vogt, Box 232, Westport, Conn. 06880
Filed Dec. 10, 1962, Ser. No. 243,452
17 Claims. (Cl. 53—29)

This invention relates in general to new and useful improvements in the dispensing art, and more particularly relates to a novel method and apparatus for packaging finely divided and granular materials in bags or pouches.

Many products are packaged in small bags or packages with the bags or packages either forming the ultimate container or being placed in boxes. The packaging of products, particularly finely divided and granular products, in small bags or packages presents two serious types of problems. The first of these problems is to economically form a bag which has a pleasing appearance and is of a construction wherein the entire contents thereof may be readily dispensed. The second of these problems is to consistently place a predetermined weight of the product within the bag and to place the product within the bag in such a manner that the upper portion of the bag remains free of the product to provide for the effective sealing of the top of the bag.

At the present time, small bags or packages are being formed and filled following two general systems. In one system, the bags are separately formed and then placed in a machine where the bags are opened and filled. In the other system, the single machine line first forms the bag and then fills the bag. It will be readily apparent that separate bag forming and filling operations require much valuable machine space and at the best, slow down the bag forming and filling operation.

In view of the foregoing, it is the primary object of this invention to simultaneously form a bag or pouch and fill the same.

Another object of this invention is to provide a novel method of forming and filling a bag or pouch wherein a bag blank is fed into a position closing the open lower end of a filler tube, and while the bag is being shaped and sealed around the filler tube, the product to be packaged within the bag is accurately measured into the filler tube, after which the bag, with the product, is removed from the filler tube and sealed.

Still another object of this invention is to provide a novel bag forming and filling operation which may be performed on a continuous basis with a bag blank being fed into the machine and in a series of operations, the bag blank is shaped and sealed to define a bag about a filler tube, whereby no orientation of a completed bag with respect to a filler is required, and the bag forming the bottom of the filler tube wherein there is no transferring of the product from the filler tube in that the product rests upon and is within the bag at all times that the product is disposed within the filler tube.

Yet another object of this invention is to provide in conjunction with a pressure differential filling operation a bag forming operation wherein there is associated with a filler tube type receptacle of the measuring apparatus, apparatus for forming a bag and wherein the bag forms a bottom of the filler tube so that in one continuous series of operations, a predetermined weight of finely divided or granular product may be placed into the filler tube, the bag shaped and sealed around the filler tube, and the bag and product removed from the filler tube as a unit.

A further object of this invention is to provide a novel method of forming and filling a small bag or pouch wherein a continuous web is provided and is cut at intervals to form bag blanks, the bag blanks are engaged with filler tubes to form the bottom of the filler tubes, and while the bags are being shaped and sealed about the filler tubes, a predetermined amount of the product filled is placed within the filler tube and resting on the bottom of the bag, after which the bag is removed from the filler tube together with the product fill which remains supported by the bottom of the bag, and then the open upper end of the bag is sealed.

Another object of this invention is to provide a novel bag forming and sealing apparatus to be used in conjunction with a filling apparatus which includes a filler tube having a receptacle defined therein whereby an accurate amount of product fill may be dispensed upon each operation, and the bag forming apparatus being of a nature to form a bag around the filler tube in a manner whereby the bag also closes the bottom of the filler tube, the bag forming apparatus also including means for sealing the bag in its formed condition, and finally sealing the bag after the product fill has been placed therein.

Another object of this invention is to provide a novel bag construction which is formed from a rectangular blank and which is adapted to have a rectangular cross-sectional, square cut bottom devoid of pockets in which product fill may be collected and trapped against ease of dispensing.

A further object of this invention is to provide a novel method of forming a bag having a substantially wrinkle-free bottom which is square cut and generally rectangular in outline, the method utilizing a rectangular blank and being in cooperation with a filler tube having an open bottom, the bottom forming portion of the bag blank being clamped against the bottom of the filler tube which is of a recessed construction so that the bottom forming portion of the blank is recessed upwardly, drawing lower edge portions of the bag blank downwardly while bringing together upper edge portions, and sealing all of the edge portions whereby the formed bag has a continuous edge seal the full length thereof and bottom tab portions which are completely sealed against entry of product fill thereinto and wherein the upwardly curved bottom portion of the bag may be readily expanded into a square cut, rectangular cross-sectional bottom without undesired wrinkling.

A still further object of this invention is to provide a novel bag or pouch which is formed from a rectangular sheet without cutting, and wherein all the seals of the bag are formed of only two thicknesses of the sheet.

With the above and other objects in view that will hereinaftaer appear, the nature of the invention will be more clearly understood by reference to the following detailed description, the appended claims and the several views illustrated in the accompanying drawings.

In the drawings:

FIGURE 1 is a schematic view showing the various stages of the bag forming and filling operation of this invention.

FIGURE 2 is a schematic elevational view showing the web from which a bag is being formed in the process of being placed between a filler tube and a bag bottom former, the view being taken generally at the position A of FIGURE 1.

FIGURE 3 is a schematic perspective view rotated from FIGURE 2 and also taken generally at position A of FIGURE 1, the view showing the bag blank being gripped for the purpose of shaping the bag blank around the filler tube.

FIGURE 4 is a fragmentary schematic elevational view taken generally at position B of FIGURE 1, and shows the bag having the bottom forming portion thereof forced upwardly and clamped against the bottom of the filler tube and with the bag being shaped around the filler tube due to the retention of the lower portion thereof by the grippers aided by vacuum as hereinafter described.

FIGURE 5 is a schematic perspective view showing the bag blank fully shaped around the filler tube and with side seam sealers closing upon the side edges of the bag blank, the view corresponding generally to position C of FIGURE 1.

FIGURE 6 is a fragmentary schematic elevational view showing the side seam sealers fully engaged with the side edges of the bag blank and in the process of sealing together the edges of the bag, the view corresponding generally to position D of FIGURE 1.

FIGURE 7 is a schematic perspective view showing the filler bag gripped along the lower portions of the side seams thereof and being moved downwardly together with the support for the bag bottom to remove the filled bag from the filler tube, the view corresponding generally to the position E of FIGURE 1.

FIGURE 8 is a fragmentary schematic perspective view showing the upper edge of the filled bag gripped by top sealers to seal close the top of the filled bag, the top sealers and the filled bag being shown in a rotated bag releasing position by phantom lines, the view corresponding generally to the position F of FIGURE 1.

FIGURE 9 is an enlarged fragmentary vertical sectional view taken through the bag filling apparatus, with the bag bottom support being spaced below the filler tube, and shows generally the details of apparatus for filling a bag during the forming thereof.

FIGURE 10 is an enlarged fragmentary vertical sectional view showing in more detail the bag filling apparatus of FIGURE 9.

FIGURE 11 is a top view of the bag bottom support taken generally along the line 11—11 of FIGURE 10, and shows the specific details thereof.

Figure 13:
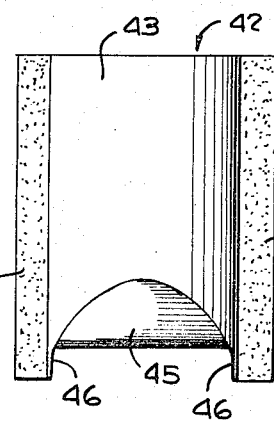
FIGURE 13 is an elevational view of the shaped bag at the time of filling and while supported by both the bag bottom support and the filler tube.
Figure 15:
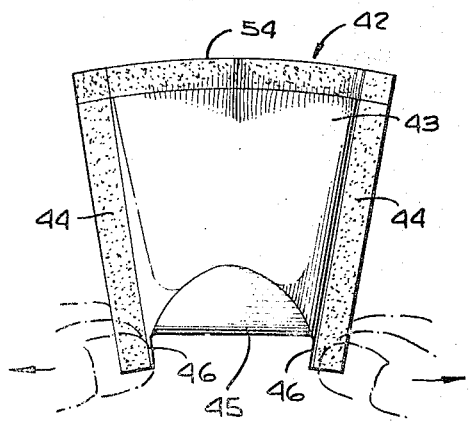

FIGURE 15 in a front elevational view of the bag of FIGURE 13 after it has been filled and the upper part thereof sealed.

Figure 16:
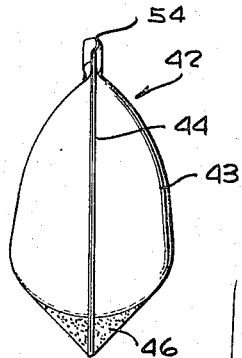

FIGURE 16 is an end view of the filled bag of FIGURE 15.

Figure 17:
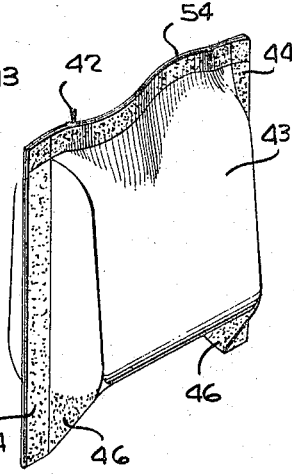

FIGURE 17 is a perspective view of the filled and reshaped bag, wherein the bottom of the bag is no longer upwardly recessed, but is of a generally square cut, rectangular outline, the bag being shown prior to the folding of the side and corner flaps of the bag.

Figure 18:
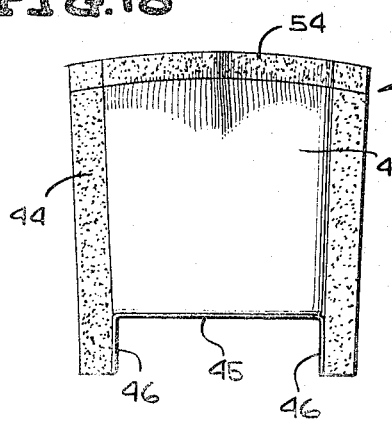

FIGURE 18 is a front elevational view of the bag of FIGURE 17 and shows further the general outline thereof.

Figure 19:
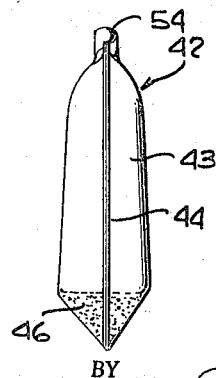

FIGURE 19 is a side view of the bag of FIGURE 17.

In accordance with this invention, the filling of the bags is accomplished by means of a filler structure which utilizes a pressure differential to fill a receptacle of a predetermined volume with the desired product fill. The receptacle filling process is of a nature wherein very accurate weights are obtained without weighing the product fill in the case of finely divided and granular materials. The filler apparatus includes a lower receptacle casing or filler tube which is open at its lower end and through which the contents of the receptacle may readily pass.

In practicing the invention, it is preferred that bag blanks be provided in the form of a continuous web which is directed between the lower end of the filler tube and a bag bottom shaping support, after which the web is severed to define an elongated rectangular bag blank of a desired length. While the central portion of the bag blank is held against movement, the bag bottom forming support is moved upwardly with the result that the bag bottom forming portion of the bag blank is shaped to conform to the contour of the upper end of the support and is clamped against the lower end of the filler tube to seal the bottom of the receptacle. This upward movement of the bag bottom forming support, accompanied by the holding of the central outer edge portions of the bag blank results in the automatic upward folding of the bag blank around the filler tube. The edges of the bag blank are then sealed to define an open ended bag which is disposed around the filler tube and which has a bottom portion closing the lower end of the filler tube.

The filling of the receptacle within the filler tube is independent of the bag forming operation, and any time after the bag blank has been clamped against the bottom of the filler tube to form a seal therewith, the receptacle within the filler tube may be filled with the product fill, in that the bag blank is tightly sealed against the lower end of the filler tube at all times during the bag forming operation around the filler tube.

When the product fill is placed within the receptacle, it is actually positioned within the bag and is supported by the bag bottom. After the bag forming operation has been completed, the bag bottom forming support, together with the bag and the product fill, are moved downwardly with the result that the bag and the product fill are separated from the filler tube. Since there is no dust forming operation which would permit dust or loose particles of the product fill to be disposed in the extreme upper part of the bag, the filled bag may be readily sealed across the top thereof by a heat sealing operation in a conventional manner.

It will be readily apparent that the bag forming and filling operation set forth above may be accomplished either in a straight line machine or a turret machine. It is also readily apparent that the machine may be indexed during the bag forming and filling operation, or the operation may be of the continuous moving type.

Referring now to FIGURE 1, it will be seen that there is schematically illustrated an embodiment of the invention of the continuous operating turret type. The turret T is preferably horizontally disposed and is mounted for rotation at a constant predetermined rate by any suitable drive means. The turret T is provided with a plurality of evenly spaced filler mechanisms. However, in FIGURE 1, there has been illustrated only one filler mechanism 20 showing the various positions thereof during the various bag forming and filling operations. It will be understood that like operations will occur at like positions for each of the filler assemblies.

Each of the filler assemblies 20 includes, among other structure, the afore-discussed filler tube, which is referred to by the numeral 21. The filler tube 21 is provided with a lower seal unit 22 which will be described in detail hereinafter. There is associated with each of the filler tubes 21 a support 23 which serves to both support a bag and form or shape the bottom thereof. Each support 23 is mounted for vertical movement in timed relation to the rotation of the turret T in a manner to be broadly described hereinafter.

In accordance with this invention, there is supplied in a conventional manner a web 24. The web 24 is preferably provided on the internal surface thereof with a plastic coating which may be heat sealed so that opposed inner face portions of the web may be directly heat sealed together without the addition of an adhesive. However, it is to be understood that this invention may also be suitably practiced with webs of the type requiring the addition of adhesive, and the adhesive in certain instances may be previously applied to the web 24 and be of the heat or contact setting type. The web 24 may be of any suitable combination of paper and plastic layers including all plastic.

The web 24 is delivered to the turret T along a generally tangential path and is fed by means of a pair of feed rolls 25 generally downwardly towards the support 23 associated therewith so that an initial curving of the web 24 may be accomplished, as is shown in FIGURE 2. It is to be understood that if desired, suitable web guides (not shown) may be provided for guiding the paper web 24 in the vicinity of the support 23. The feed rolls 25 are driven in timed relation to the rotation of the turret T and have associated therewith cooperating knife blades 26 which sever from the web 24 at timed intervals like bag blanks 27. It is to be noted that each bag blank 27 is severed from the associated paper web 24 at a time when it is substantially centered with respect to the aligned filler tube 21 and the associated support 23.

In order to effect the folding of the bag blank 27 up around the filler tube 21 in the forming of the bag, there is provided adjacent each of the supports 23 a pair of opposed grippers, each of which is generally referred to by the numeral 28. Each gripper 28 includes a lower jaw 29 having a rear extension 30 terminating in a cam engageable pin 31. An upper jaw 32 is associated with the lower jaw 29 and is pivotally mounted for swinging movement about a pin 33 which connects together the jaws 29 and 32. The jaw 32 is constantly urged towards the jaw 29 by means of a spring 34 and has an extension leg 35 which is engageable by cam means to effect the movement of the jaw 32 away from the jaw 29.

It is to be understood that the grippers 28 are movable towards one another and apart by cam means (not shown) which engage the pins 31. It is also to be understood that the grippers 28 are openable by cam means (not shown) which engage the arms 35. Such cam means will be operated in timed relation to the rotation of the turret T in any conventional manner.

When the bag blank 27 is fed beneath the filler tube 21, the grippers 28 are in their inwardly projected positions and the jaws are opened whereby the bag blank 27 may be slid between the open jaws of the grippers 28. When the bag blank 27 becomes aligned with the filler tube 21, the jaws of the grippers 28 are allowed to close and to grip and hold the opposite edges of the bag blank 27.

As the turret T rotates, the support 23 moves upwardly and moves the central portion of the bag blank 27 upwardly against the resistance of the grippers 28 which remain fixed against vertical movement. As a result, the central portion of the bag blank 27 is shaped to conform to the upper surface of the support 23 and the bag blank 27 is folded around the filler tube 21. This upward movement of the support 23 continues until the central or bottom defining portion of the bag blank 27 is clamped against the seal member 22 of the filler tube 21 so that the bag blank 27 forms an effective seal for the lower end of the filler tube 21. At the same time, the wrapping of the bag blank 27 around the filler tube 21 is such that effectively an unsealed bag is formed. This is clearly shown in FIGURE 4.

After the bottom forming portion of the bag blank 27 has been clamped against the underside of the filler tube 21 and has been upwardly contoured to conform to the configuration of the upper end of the support 23, the grippers 28 begin to retract outwardly while side sealers, generally referred to by the numeral 36, swing together to heat seal together side edges of the bag blank 27. Each side sealer 36 is mounted on an upper pivot pin 37 and includes a main sealing plate 38 and a lower sealing plate 40 in the form of an iron-like structure. The support 23 is provided with a pair of ironing surfaces 41 in diametrically opposite relation and adjacent the side edges of the bag blank 27. The surfaces 41 are flat and slope downwardly and outwardly. It is to be noted that the surfaces 41 are generally triangular in outline and correspond to flap portions which are formed on the bag at the time of the side seam sealing.

Figure 14:
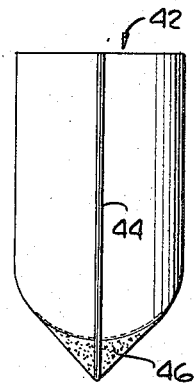
FIGURE 14 is an end view of the bag of FIGURE 13 and shows further the details thereof.

It is deemed advisable to specifically describe the bag as it now appears, and accordingly, reference is here made to FIGURES 13 and 14. The bag, which is generally referred to by the numeral 42, includes a body portion 43 which is defined by a pair of side seams 44 which extend the full height of the bag 42. The body portion 43 is also defined by a bag bottom 45 which at this time is held up into the interior of the bag and is of a rounded configuration conforming to the surface configuration of the upper end of the support 23. The side seams or flaps 44 are reinforced at the lower ends thereof by transversely extending flaps 46 which are triangular in outline, as is clearly shown in FIGURE 14. It is these triangular-outline flaps 46 which are formed by sealing together material of the bag blank 27 against the surface 41. It is to be noted that by the forming of the sealed together flaps 46, the bottom of the bag 42 has no corners or crevices into which finely divided and granular material may enter and thus be trapped so as not to be available to the consumer.

Referring once again to FIGURES 5 and 6, it will be seen that the grippers 28 are positioned and controlled so that as the side seamers 36 come together to the positions shown in FIGURE 6, the grippers 28 pass from engagement with the bag blank 27 so that there is no interference between the grippers 28 and the side seamers 36. However, the grippers 28 do maintain control over the bag blank 27 until just before they are engaged by the side seamers 36 to assure the proper formation of the side seams 44 and the seams of the flaps 46. The bag 42 having been filled during the actual forming and side sealing thereof is now ready to be moved down off of the filler tube 21. At this time, it is pointed out that the bottom 45 of the bag 42 is adhered to the upper surface of the support 23 through a vacuum drawn in the upper portion of the support 23 in a manner to be described hereinafter. This adherence of the bottom of the bag to the support 23 facilitates the downward movement of the bag. In addition, a pair of grippers 47 are provided for gripping the lower portions of the side seams 44 to facilitate the downward stripping of the bag 42 from the filler tube 21. Since the product fill dispensed into the filler tube 21 is resting on the bottom 45 of the bag 42 and is within the confines of the bag 42 at all times, it will be readily apparent that the downward movement of the bag 42 will result in the like downward movement of the product fill so that the bag 42 and the product fill are moved in unison away from the filler tube 21. This is clearly shown in FIGURE 7.

Referring now to FIGURE 8 in particular, it will be seen that as soon as the upper edge of the bag 42 clears the filler tube 21, the upper edge is engaged by a pair of top sealers 48 and 49. The top sealers 48 and 49 are mounted for swinging movement and are mounted as a unit with other top sealers for rotation about a central shaft 50. The shaft 50 carries a head 51 which, in turn, carries a pivot 52 for each pair of top sealers 48 and 49. It is preferred that of each pair of top sealers 48 and 49, the leading top sealer, the top sealer 48, is fixed, and the top sealer 49 is swingable relative thereto. This permits the top sealer 48 to be positioned in advance of the bag 42 while it remains on the filler tube 21 and the top sealer 49 to be clear of the bag. The top sealer 49 approaches the top sealer 48 as the bag is lowered from the filler tube 21 and cooperates with the top sealer 48 to grip the top of the bag 42 as soon as it is clear of the filler tube 21, as is clearly shown in FIGURE 8. The top sealers 48 and 49, together with the bag 42 then swing as a unit into overlying relation with respect to a discharge chute 53 at which time the top sealer 49 does not move as fast as the top sealer 48 so that the filled and closed bag 42 is released. It is to be understood that the chute 53 will be positioned sufficient to one side of the turret T for there to be time for the necessary seal to be formed.

At this time, it is pointed out that since the product fill is always resting upon the bottom of the bag 42, when the bag 42 and the product fill are removed from the filler tube 21, there is very little relative movement between the product fill and the bag 42 with the result that there is no dust or movement of the fill particles. Thus, there is no fill disposed between the layers of the bag 42 at the upper end thereof at the time the top sealers 48 and 49 engage the bag. Accordingly, the necessary bag closing seal may be readily formed by the top sealers 48 and 49.

It will be seen that the top sealers 48 and 49 function to provide each of the bags 42 with a top seal 54, as is clearly shown in FIGURES 15 through 19, inclusive. The top seal is slightly arcuate in elevation and of a shallow S-shape when initially formed to compensate for the flaring of the pouch due to the flattening thereof. The top sealers 48 and 49 are shaped accordingly. The top seal 54 completes the filling and sealing of the bag 42. However, in accordance with this invention, it is also desired that the bag 42 be reshaped.

The reshaping of the bag 42 includes the downward movement of the bottom 45 to a generally horizontal position and wherein the bottom 45 assumes a generally rectangular outline. This is initiated by means of the grippers 47 which at the lower ends of their downward travel move outwardly so as to pull apart the side seams or flaps 44 of the bag 42 in the manner diagrammatically illustrated in FIGURE 15. This in itself is not sufficient to completely reshape the bottom of the bag 42. However, when the bag 42 is dropped into the chute 53 and during subsequent handling operations, the product fill within the bag 42 serves to reshape the bag so that the bag eventually assumes the shape clearly illustrated in FIGURES 17, 18 and 19.

Depending upon the particular product being packaged, the bag 42 may be the ultimate container, or the bag may be placed within a box or similar type of container. It is to be understood that in the final shaping of the bag 42, the side flaps 44 will be folded alongside the bag, and the flaps 46, together with lower portions of the side flaps 44, will be folded into underlying relation with respect to the bottom 45. This will greatly enhance the appearance of the filled bag 42.

At this time, it is pointed out that in a continuously operating turret type of apparatus, the grippers 28, the side seam sealers 36 and the grippers 47 will be carried by the turret T and there will be one set of each for each of the filler tubes 21. On the other hand, there need only be one set of top sealers, with the set of top sealers including three or more pairs of top sealers 48 and 49, as is generally shown in FIGURES 1 and 8. It is also to be understood that the turret T could be indexed after each operation. When the turret T is indexed, the various mechanisms which form and operate on the bag 42 could be mounted at the individual stations at which the turret is indexed in lieu of being carried by the turret. Also, as has been pointed out above, the apparatus could be incorporated in a straight line machine.

Referring now to FIGURE 9 in particular, it will be seen that the turret T includes an upper plate 55 which supports the filling devices or apparatus 20 and a lower plate 56 which supports the supports 23. For each of the supports 23, there has been illustrated a pair of air cylinders 57 which are secured to the underside of the plate 56 and which have piston rods 58 connected together by a crossbar 59 which supports the respective ones of the supports 23 and effects the vertical reciprocatory movement thereof in timed relation to the bag forming and filling operation. Although air cylinders have been illustrated for purposes of simplicity, it is to be understood that the supports 23 may be vertically reciprocated in timed relation to the rotation of the turret T by cam followers and cam tracks in a conventional manner.

Each of the filling devices 20 includes a housing 60 which is suitably mounted within the plate 55 in any desired manner. The associated filler tube 21 is provided at the upper end thereof with a flange 61 which is releasably secured to the underside of the housing 60 by means of fasteners 62.

The housing 60 has a lower conical projection 63 which projects down into the interior of the filler tube 21. A generally frusto-conical filter 64 is secured to the underside of the extension 63 by means of a locking ring 65. The filter 64 is preferably formed of a high porosity, small passage material which permits freedom of flow of air or gas therethrough while excluding the flow of the finely divided material which may be packaged in accordance with this invention. The filter 64 may be formed of material such as sintered metal or sintered plastics. The lower end of the filter 64, which flares downwardly, is seated in a retainer 66 and is sealed relative thereto. The retainer 66 is, in turn, sealed to the seal member 22 which is interlocked with the lower end of the filler tube 21 at 22'. The filter 64, together with the seal member 22, defines a receptacle referred to by the numeral 67 which determines the volume of the product fill to be placed within the bag 42.

The lower portion of the housing 60 is provided with an annular chamber 68 which communicates with the exterior of the filter 64 and receives air and other gasses passing therethrough. The chamber 68 opens into an internally threaded bore 69 into which a pipe 70 is threaded. The pipe 70 is connected to a valve 71 whose purpose will be set forth in detail hereinafter.

Flow of the product fill into the receptacle 67 is controlled by means of a valve which is generally referred to by the numeral 72. The valve 72 is seated within the housing 60 and includes a valve body 73 which is provided at the upper end thereof with a top flange 74. The lower end of the valve body 73 is provided with a bottom flange 75. The top flange 74 is seated within a socket 76 formed in the top of the housing 60 and is clamped in place by means of a ring 77 seated in the socket and resting on the top flange 74. The ring 77 is held in place by a plurality of clamping fasteners 78. The bottom flange 75 is interlocked with the extension 63 and is secured in place by means of the securing ring 65.

It is to be understood that the valve 72 is of a unitary construction and is preferably formed of a tough, yet resilient, material, such as neoprene. It is to be noted that the valve body 73 tapers in thickness downwardly and is generally conical in outline. Depending upon the particular material to be dispensed, the lower part of the valve body 73 may be provided with a valve unit 79 in the form of a conventional type of flap valve.

The housing 60 has a chamber 80 extending around the valve body 73. The valve body 73 is contracted and expanded by air pressure. To this end, there is seated within the housing 60 surrounding the valve body 73 and in communication with the chamber 80 a distributor ring 81. A passage 82 opens through the housing 60 between the distributor ring 81 and an internally threaded bore 83 in which there is threaded a pipe 84, as is shown in FIGURE 9. The pipe 84 is connected to a valve 85 to which there is connected a vacuum line 86 and a pressure line 87. The operation of the valve 72 will be described in detail hereinafter.

A jacket 88 extends upwardly from the ring 77 and is clamped between the ring 77 and an upper clamping ring 89. A casing 90 is disposed within the jacket 88 in spaced relation thereto. The casing 90 is also formed of a porous material such as a sintered plastic so that air may freely pass therethrough. The jacket 88 is provided with a fitting 91 to which there is connected a pipe 92 leading to a valve 93. The valve 93 has a vent line 94 and a pressure line 95 connected thereto.

The clamping ring 89 is associated with the bottom of a hopper 96 which supplies the product fill to the interior of the casing 90. The hopper 96 may be of any type of construction. However, in accordance with this invention, it is not desired to have the product fill within the hopper 96 in direct communication with the casing 90 during a filling operation. The reason for this will be set forth in detail hereinafter. In certain instances, it may be desired to seal the upper end of the jacket 88 during a filling operation. To this end, the hopper 96 may be provided with a plate 97 which rotates relative to the hopper 96 and which seals the bottom wall 98 of the hopper with respect to the jacket 88 during a filling operation.

The typical operation of the filling device 20 may vary in accordance with the product to be dispensed and the desired filling conditions. The filling device 20 operates on a pressure differential, and may dispense the product fill by pressure, by means of application of a vacuum, or by a combination of pressure and vacuum. In order to accomplish the desired operation of the filling device 20, the valve 71 has connected thereto a vacuum line 99 and a pressure line 100.

When the filling operation is to take place by means of the application of vacuum, the valve 93 is set in the position to vent the casing 88. During the disepnsing operation, the valve 71 is set at its vacuum position, and a vacuum is drawn through the chamber 68 so that air is drawn out of the receptacle 67. Simultaneous with the operation of the valve 71, the valve 85 is operated so as to apply a vacuum to the chamber 80 and drawn the valve body 73 outwardly to generally the position shown in FIGURE 10. The application of the vacuum exteriorly of the filter 64 causes the finely divided material or granular material to be packaged which has been released by the valve 72 to rapidly flow downwardly into and fill the receptacle 67 which is closed at its lower end by the bag blank 27. As soon as the receptacle 67 is filled, the filling of which is instantaneous, further flow of the product fill is prevented by the product fill within the receptacle 67. The valve 85 is then turned to its pressure position, wherein air under pressure is directed into the chamber 80 around the valve body 73 and the valve body 73 is forced inwardly and upwardly so as to simultaneously close off the receptacle 67 to the column of product and at the same time to upwardly lift the column of product so as to loosen the same. This upward movement of the valve body 73 and the product thereabove provides a head, which, when the valve body 73 is again expanded, provides for an initial acceleration of the product down through the valve 72 into the receptacle 67. As the valve 72 is moved to a sealed position, the valve 71 is turned to its pressure position and there is a backflow through the filter 64 to assure the cleaning of the filter.

When there is to be a pressure filling operation, the valve 71 is connected to a vent line as opposed to the vacuum line. The valve 72 is opened and closed in the same manner as that described above. On the other hand, at the time of fill, the valve 93 is moved to its pressure condition so that air or other fluid under pressure may be directed through the casing 90 to force the product therein down through the valve 72. It is to be understood, of course, that the upper end of the casing 90 must be sealed at this time. The product is forced down through the valve 72 into the receptacle 67 with all air and gases entrapped therein flowing out through the filter 64. After the receptacle 67 has been filled and the valve 72 again closed, the valve 71 may be turned to its pressure position for a backflow of air to clean the filter 64.

When the filling operation is a combination of pressure and vacuum, the valve 71 is turned to its vacuum position simultaneous with the turning of the valve 93 to its pressure poition. The product within the casing 90 is then forced down through the valve 72 through a combination of pressure thereabove and a vacuum therebelow.

At this time, it is pointed out that the filling operation requires a minimum time and may be accomplished well within the time required to fold the bag blank 27 up around the filler tube 21 and seal the side edges thereof.

Thus the bag filling operation may take place simultaneous with the bag shaping and sealing operations.

Figure 12:
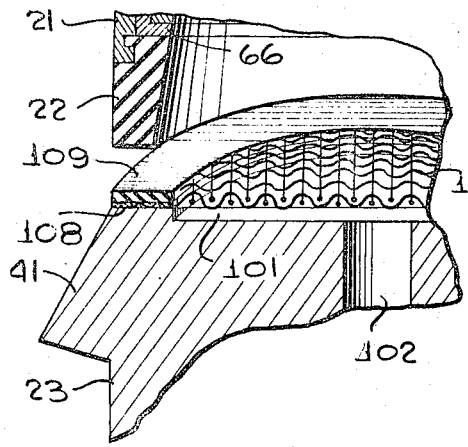
FIGURE 12 is an enlarged fragmentary vertical sectional view taken generally along the line 12—12 of FIGURE 10 and shows specifically the details of construction of the bag bottom support at the upper end thereof and the filler tube at the lower end thereof.

Reference is now made to FIGURES 10, 11 and 12 wherein there are illustrated the details of one of the supports 23. It has been found desirable to draw a vacuum at the top of the support 23 to facilitate the holding and shaping of the bag blank 27, to maintain the shape of the bag blank 27 during a vacuum filling operation, and to facilitate the removal of a filled bag from the filler tube. To this end, the upper end of the support 23 is provided with a chamber 101 which is in communication with an axial passage 102. The axial passage 102, as is clearly shown in FIGURE 10, is intersected at its lower end by a transverse passage 103. The transverse passage 103 opens at its outer end into a fitting 104 threaded into the support 23 and to which there may be connected a vacuum line 105, as shown in FIGURE 9. The application of a vacuum through the vacuum line 105 is controlled by a valve 106.

In order to permit the desired application of a vacuum to the bag blank and bag bottom after the bag is formed, and at the same time to prevent the downward distortion of the bag, the chamber 101 is closed by a screen 107. The peripheral edge portion of the screen 107 is compressed to define a compact peripheral edge 108 having a thickness equal to substantially one-half of the normal thickness of the screen 107. This reduction in thickness of the peripheral edge of the screen 107 provides a recess in which a peripheral gasket 109 may be seated. The gasket 109 provides the necessary seal between the support 23 and the bag material.

From the foregoing, it will be readily apparent that there has been devised a highly desirable apparatus and method suitable for the simultaneous forming of a bag and the filling thereof as opposed to the conventional method of first forming a bag and then filling the same. By combining the two operations, much less time and machine space is required. Further, by utilizing the novel filling device, it will be readily apparent that a large volume of the entrapped air within the product fill is removed, and accordingly, the receptacle in which the product fill is initially placed is filled with the prcduct fill as opposed to a mixture of the product fill and air or any other suitable gas. Thus, a very accurate dispensing is obtainable. In addition, by forming the bag in accordance with this invention, a square bottom bag may be formed from a rectangular blank without cutting and without wrinkling.

Although only a preferred example of the principles of this invention has been set forth in detail here, it is to be understood that modifications may be made therein within the scope and spirit of the invention, as defined in the appended claims.

I claim:

1. A method of forming a filled pouch comprising the steps of providing a bag blank, clamping a bag bottom forming portion of the bag blank against a lower end of a measuring tube to seal the measuring tube, shaping the bag blank around the measuring tube and sealing side edges of the bag blank together to form an open ended bag, filling the measuring tube with a fill and with the fill seating against the bottom of the bag, simultaneously removing the fill and the bag from the measuring tube with the fill remaining seated on said bag bottom, and then sealing the bag open end.

2. A method of forming a filled pouch comprising the steps of providing a bag blank, clamping a bag bottom forming portion of the bag blank against a lower end of a filler tube to seal the filler tube, shaping the bag blank around the filler tube and sealing side edges of the bag blank together to form an open ended bag while placing a fill in the filler tube and against the bottom of the bag, simultaneously removing the fill and the formed open end bag from the filler tube with the fill remaining seated on said bag bottom, and then sealing the bag open end.

3. A method of forming a filled pouch comprising the steps of providing a bag blank, clamping a bag bottom forming portion of the bag blank against a lower end of a filler tube to seal the filler tube, shaping the bag blank around the filler tube and sealing side edges of the bag blank together to form an open ended bag, placing a fill in the filler tube, removing the fill and the formed open end bag from the filler tube with the fill remaining seated on said bag bottom, and then sealing the bag open end.

4. A method of forming a filled pouch comprising the steps of providing a bag blank, clamping a bag bottom forming portion of the bag blank against a lower end of a filler tube to seal the filler tube and to form an upwardly bowed bag bottom, shaping the bag blank around the filler tube to define side edge portions and lower corner flaps and sealing the side edge portions and the lower corner flaps to form an open ended bag, placing a fill in the filler tube and against the bag bottom, removing the formed open end bag and fill from the filler tube, sealing the bag open end, and then reshaping the bag bottom to be of a square bottom type.

5. A method of forming a filled pouch comprising the steps of providing a bag blank, clamping a bag bottom forming portion of the bag blank against a lower end of a filler tube to seal the filler tube and to form an upwardly bowed bag bottom, shaping the bag blank around the filler tube to define side edge portions and lower corner flaps and sealing the side edge portions and the lower corner flaps to form an open ended bag while placing a fill in the filler tube and against the bag bottom, removing the formed open end bag and fill from the filler tube, sealing the bag open end and then reshaping the bag bottom to be of a square bottom type.

6. A method of forming a filled pouch comprising the steps of providing a bag blank, clamping a bag bottom forming portion of the bag blank against a lower end of a filler tube to seal the filler tube, shaping the bag blank around the filler tube and sealing side edges of the bag blank together to form an open ended bag, placing a compacted fill in the filler tube by a pressure differential filling method and against the bottom of the bag, simultaneously removing the fill and the formed open end bag from the filler tube with the fill remaining seated on said bag bottom, and then sealing the bag open end.

7. A method of forming a filled pouch comprising the steps of providing a bag blank, clamping a bag bottom forming portion of the bag blank against a lower end of a filler tube to seal the filler tube and to form an upwardly bowed bag bottom, shaping the bag blank around the filler tube to form an open ended bag, placing a fill in the filler tube and against the bag bottom, removing the formed open end bag and fill from the filler tube, sealing the bag open end, and then reshaping the bag bottom to be of a square bottom type.

8. The method of claim 1 wherein the measuring tube has a receptacle therein defined in part by the lower end of the measuring tube, and the fill is placed within said receptacle by a pressure differential filling operation to accurately control the weight of the fill.

9. An apparatus for forming and filling a bag comprising a filler tube having a discharge end, filling means for delivering a predetermined charge to said filler tube, a support aligned with said filler tube and having an end opposing said filler tube discharge end, said filler tube end and said support end being complementary, means for delivering a bag blank between said filler tube and said support, means for effecting the relative movement of said filler tube and said support to clamp the bag blank against the filler tube discharge end in sealing relation, means to effect the forming of the bag blank around the filler tube, means for sealing edges of the bag blank to form an open end bag, means for removing the formed open end bag and the fill from the filler tube, and means for sealing the open end of the tube.

10. The apparatus of claim 9 wherein said filler tube is in the form of a measuring cup which is filled prior to the relative movement of the formed open end bag with respect to the filler tube whereby a predetermined amount of fill is placed in each formed bag.

11. The apparatus of claim 9 wherein said filling means includes a receptacle within said filler tube having a porous wall portion, and valve means associated with said receptacle for delivering a fill of a finely divided nature to said receptacle by means of a pressure differential with entrapped air being removed from the fill within said receptacle to maintain an accurate control of the fill weight.

12. The apparatus of claim 9 wherein said filling means are operated simultaneous with the bag forming and sealing means whereby the bag is filled when formed.

13. The apparatus of claim 9 wherein the bag forming means includes opposed bag blank grippers for holding the central portion of the bag blank stationary while the bag bottom is being clamped.

14. The apparatus of claim 9 wherein the means for removing the bag includes a pair of bag seam grippers first movable relative to said filler tube to retract the filled bag and then away from one another to exert a bottom reshaping tensional force on the lower portion of the bag.

15. The apparatus of claim 9 wherein said support has vacuum means for retaining the shape of the bag bottom during the bag filling operation and for aiding in the removal of the filled bag from said filler tube.

16. The apparatus of claim 9 wherein said means for sealing the bag open end are pivotally mounted and also function as bag transfer means.

17. The apparatus of claim 9 wherein said support has a pair of oppositely directed ironing surfaces for cooperation with said edge sealing means to form lower sealed flaps at the opposite ends of the bag bottom.

References Cited by the Examiner

UNITED STATES PATENTS

| | | | |
|---|---|---|---|
| Re. 25,694 | 12/1964 | Nichols | 229—55 |
| 528,899 | 11/1894 | Barnewits | 52—38 X |
| 1,313,234 | 8/1919 | Jones | 53—38 X |
| 2,009,416 | 7/1935 | Schilder | 53—192 |
| 2,233,945 | 3/1941 | Gorwick | 53—29 |
| 2,564,969 | 8/1951 | Goldberg | 141—67 |
| 2,690,634 | 10/1954 | Ketchpel et al. | 53—192 |
| 2,949,711 | 8/1960 | Vogt | 53—24 |
| 3,103,300 | 9/1963 | Lau | 141—67 X |
| 3,143,276 | 8/1964 | Nichols | 229—55 |

FOREIGN PATENTS 543,169   12/1955   Belgium.

FRANK E. BAILEY, Primary Examiner.

S. ABEND, N. ABRAMS, Assistant Examiners.